Oct. 29, 1968  D. H. PEACOCK  3,407,561
FRAMEWORKS
Filed Jan. 9, 1967  3 Sheets-Sheet 2
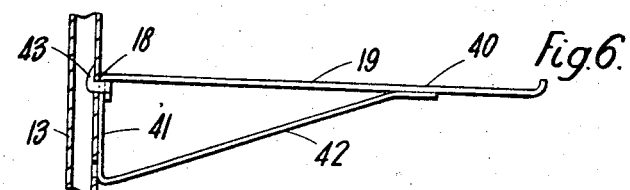
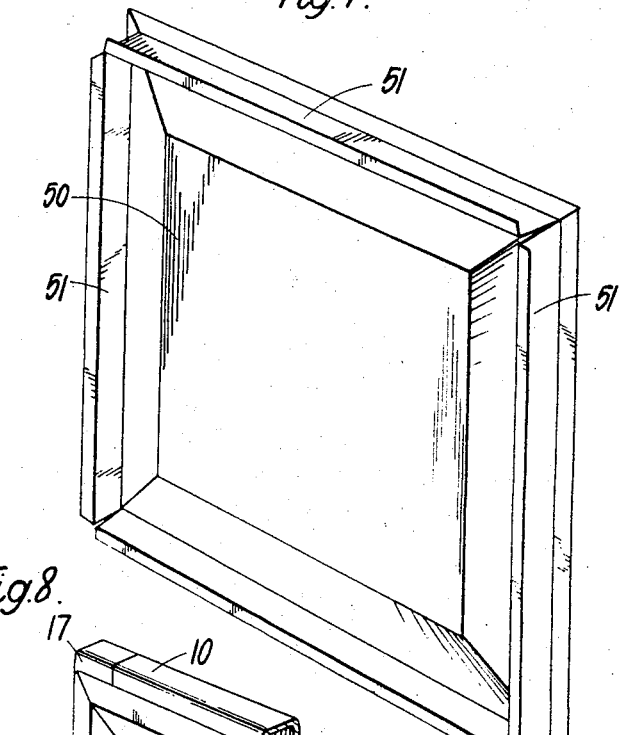
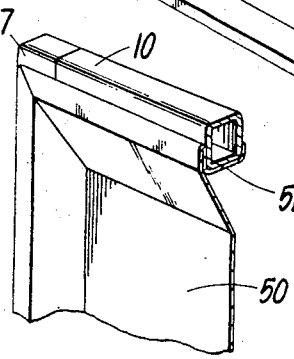
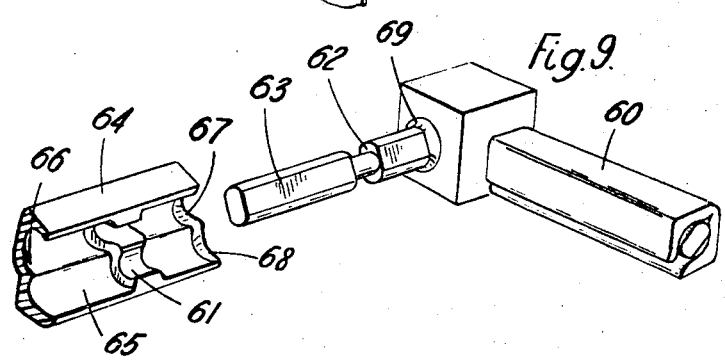

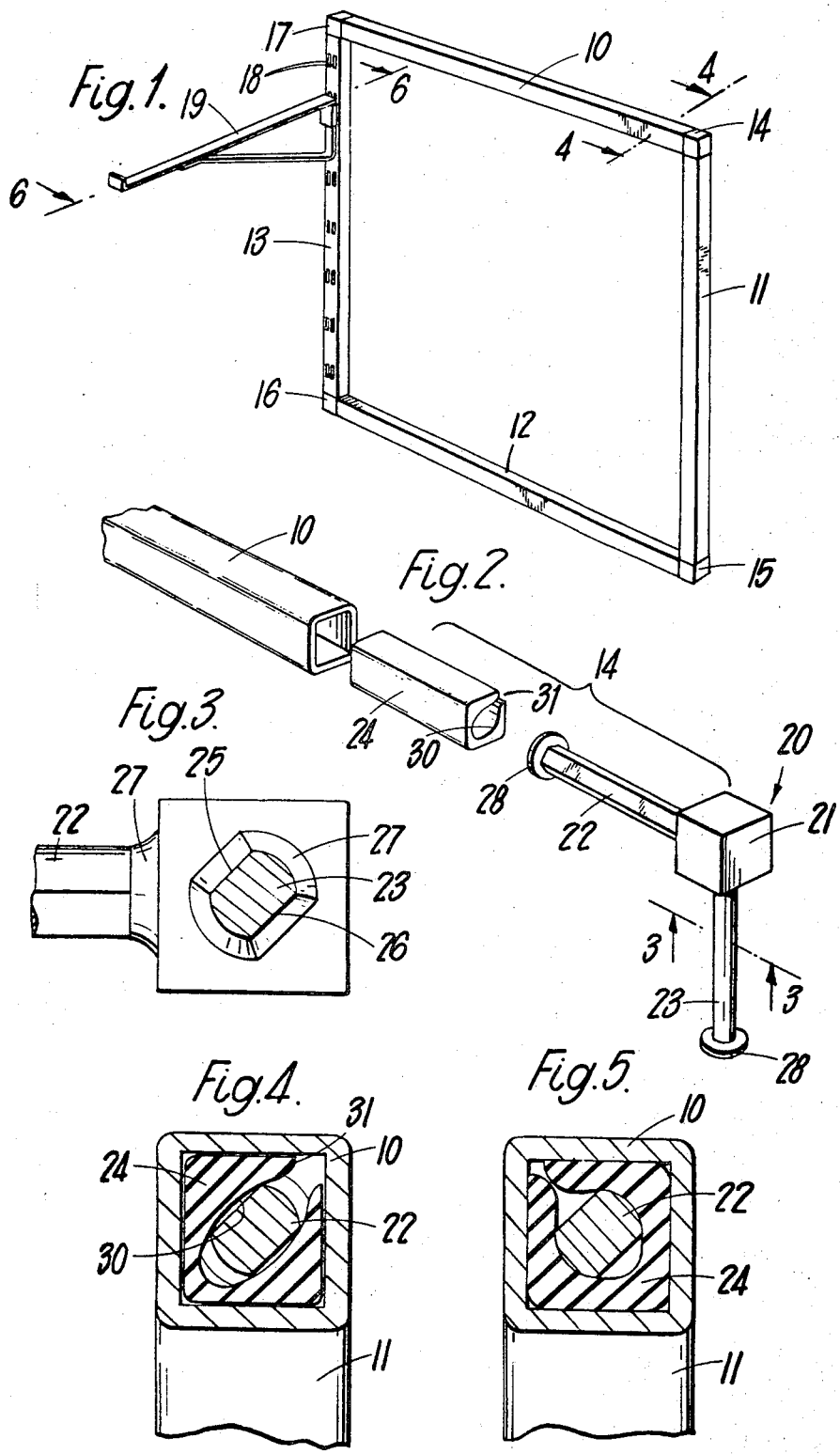

Oct. 29, 1968 D. H. PEACOCK 3,407,561
FRAMEWORKS
Filed Jan. 9, 1967 3 Sheets-Sheet 3
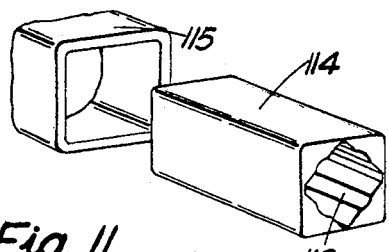
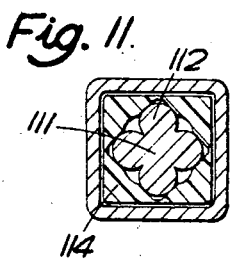
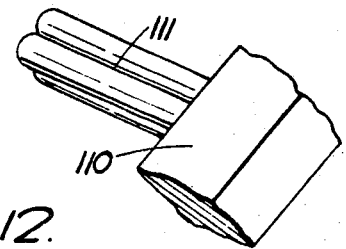
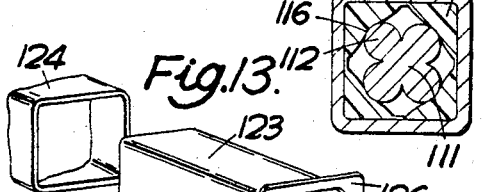
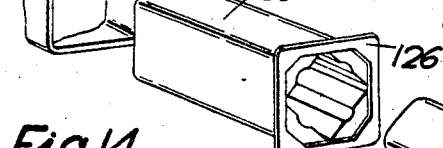
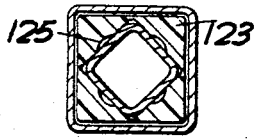
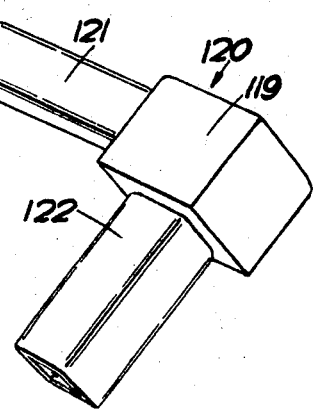
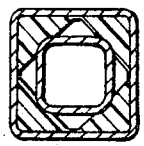

United States Patent Office 3,407,561
Patented Oct. 29, 1968

3,407,561
FRAMEWORKS
David Henry Peacock, London, England, assignor to Versatile Fittings (W.H.S.) Limited, London, England, a British company
Continuation-in-part of application Ser. No. 387,138, Aug. 3, 1964. This application Jan. 9, 1967, Ser. No. 608,040
12 Claims. (Cl. 52—656)

ABSTRACT OF THE DISCLOSURE

A device for locking together a hollow tube and an end fitting comprising on the end fitting a spigot which enters within the tube and a sleeve of resilient material within the tube and surrounding the spigot. The sleeve is a non-rotatable fit in the tube and the adjoining surfaces of the sleeve and spigot are so shaped that the spigot, the sleeve and the tube may be locked together by rotation of the spigot in the sleeve.

---

This application is a continuation-in-part of my copending application Ser. No. 387,138 filed on Aug. 3, 1964, now abandoned for hollow tubes and containing additional subject-matter.

The invention relates to frameworks of the kind which are erected from hollow tubes.

The invention provides a framework comprising a hollow tube having a non-circular internal cross-section of substantially regular polygonal shape, an end fitting having a body, a spigot extending from said body, an expandable sleeve of resiliently deformable material within the end portion of said tube and surrounding the spigot, said sleeve having an external cross-section substantially complementary to the internal cross-section of the tube and having a sliding fit within said tube, said sleeve having a bore of generally oval cross-section with the largest transverse dimension of the bore being contained in the same plane as that defined by the opposed corners of the sleeve, the spigot having a substantially oval cross-section of which the greatest dimension extends in the same plane as the largest transverse dimension of the bore of the sleeve and which dimension is slightly greater than the smallest dimension of the bore of the sleeve, the spigot, tube and sleeve being so constructed and arranged that when the spigot is positioned with its greatest dimension at such an angle to the said plane that said deformable material will be forced into the other corners of said polygon defined by said tube, whereby the spigot, tube and sleeve will all be in locked frictional engagement.

Three specific embodiments of frameworks according to the invention will now be described with reference to the accompanying drawings in which:

FIGURE 1 is a perspective view of a first framework,
FIGURE 2 is an exploded perspective view of a tube and an end attachment,
FIGURE 3 is a sectional view on the line 3—3 in FIGURE 2,
FIGURE 4 is a sectional view on the line 4—4 in FIGURE 1 showing the spigot, tube and sleeve in their unlocked position,
FIGURE 5 is a view corresponding to FIGURE 4 showing the spigot, tube and sleeve in their locked position,
FIGURE 6 is a sectional view on the line 6—6 in FIGURE 1,
FIGURE 7 is a perspective rear view of a panel,
FIGURE 8 is a perspective front view partly in section of the panel in position in a frame,
FIGURE 9 is a perspective view of a modification of the first framework,
FIGURE 10 is an explanded perspective view of the tube and end fitting of a second embodiment,
FIGURE 11 is a section through the tube and end fitting,
FIGURE 12 is a section corresponding to FIGURE 2 but with the end fitting rotated and locked in position in the tube, and
FIGURES 13 to 15 are the same views as FIGURES 10 to 12 respectively of a third embodiment.

FIGURE 1 shows the general arrangement of the first framework. There are four square tubes 10, 11, 12, and 13 joined together by means of end attachments 14, 15, 16 and 17. The tube 13 has pairs of slots 18 in one of its faces and a bracket 19 is attached to the tube 13 by means of slots.

As can be seen from FIGURE 2 the end attachment 14 comprises an end fitting 20 and a sleeve 24. The end fitting 20 comprises a tube 21 and two spigots 22 and 23 extending from two of the faces of the cube. As can be seen from FIGURE 3 the cross section of each spigot is generally oval with two flattened faces 25 and 26. At the end of the spigot adjoining the face of the cube there is a small skirt 27 which reinforces the joint between the spigot and the cube.

At the end of each spigot there is an enlarged head 28 forming an end stop.

The outer periphery of the sleeve 24 is square and the outer periphery is a sliding fit in the bore of the tube 10. The bore 30 of the sleeve 24 is generally oval as can be seen from FIGURE 4 which shows the sleeve in its unstressed condition. The sleeve 24 is made of flexible material such as nylon. There is a longitudinal slit 31 extending along the length of the sleeve.

To assemble the tube 10 on to the end fitting 20 first the sleeve 24 is placed in position on the spigot 22 and the end stop 28 prevents the sleeve 24 slipping off the spigot. The spigot and sleeve are then slid as a unit inside the tube 10 and assume the position shown in FIGURE 4. The tube 10 and the sleeve 24 are then rotated as a unit through 90° to the position shown in FIGURE 5. In this position it will be seen that the wider cross-section of the spigot extends across the narrower cross-section of the bore of the sleeve and expands the sleeve into gripping engagement with the tube 10 and the spigot. In other words, the tube 10 is now firmly attached to the end fitting 20.

To assemble the complete frame shown in FIGURE 1 the first step is to assemble two opposed sides, for example, the sides 10 and 12 with their end attachments 14, 17 and 15, 16. The tubes are locked in position on the end attachments. The other two sides 11 and 13 are then placed in position on the end attachments 14, 17 but are not locked into position. Then the side 12 together with its end attachments 15, 16 is slid into position so that the end attachments 15, 16 lie within the tubes 11 and 13. The tubes 11 and 13 are then both rotated by 90° which locks them in position with the end attachments at both ends of the tubes 11 and 13 with the same movement.

The bracket 19 is shown in detail in FIGURE 6 and comprises a strip of metal bent to shape to form a bracket arm 40 and two support bars 41 and 42. The bar 42 is welded to the bar 40. A further strip of metal is formed with two ears 43 at its ends and this strip is welded in position at the top of the bar 41 so that the two ears 43 project behind the bracket 19. The bracket 19 can then be hooked into position in the slots 18 by the ears 43 engaging behind the slots and the bar 41 lying against one face of the tube 13.

The panel 50 shown in FIGURE 7 is used when it is desired that the frame shown in FIGURE 1 should be a closed frame. The front surface of the panel 50 is dished as can be seen from FIGURES 7 and 8. Along each edge of the panel 50 there is a U-shaped channel 51 which faces outwardly of the panel. The panel 50 is clipped in place by springing the channels 51 inwardly of the panel, pushing the panel into position in the frame and releasing the channels 51 so that they adopt the position shown in FIGURE 8 where the channels 51 engage the tubes of the frame.

FIGURE 9 shows a modified structure in which a sleeve 60 is provided with an internal rib 61 which engages with a groove 62 in a spigot 63. The engagement of the rib and the groove enables the sleeve to be withdrawn together with the spigot from a tube, and accordingly there is no need for an end stop as shown in the previous examples.

The sleeve 60 is of nylon and is made by injection moulding. The sleeve is formed of two parts 64 and 65 joined together by a hinge 66. At the end of the sleeve nearer the root end of the spigot there are recesses 67, 68 to fit around the skirt 69 at the root end of the spigot.

As can be seen from FIGURE 10 an end fitting 110 in the form of a square rod has a spigot 111 projecting from one face. The spigot 111 has the section of a four leafed clover as shown in FIGURES 11 and 12 with four projections or leaves 112.

The spigot 111 is a silding fit with in a sleeve 114 which has the cross-section of a smaller square inside a larger square with the smaller square rotated by 45° with respect to the larger square. The outer square of the seam 114 is a sliding fit within a square tube 115.

FIGURE 11 shows the tube, the sleeve and the spigot in engagement and the spigot 111 is rotated by 45° to the position shown in FIGURE 12 to lock the spigot and hence the end fitting to the tube 115. In this position the projections 112 engage the mid-points of the sides of the bore of the sleeve 114 to force the sleeve outwardly into engagement with the tube. Axial grooves 116 are provided in each of the sides of the bore of the sleeve 114 to locate the spigot in the locked position.

The end fitting may be unlocked from the tube by once again rotating the end fitting and the spigot by 45° relatively to the tube so that the projections 112 return to the position shown in FIGURE 11.

The sleeve 114 is made of any suitable expandable material for example nylon and the tube 115 and the end fitting and spigot are made of metal.

FIGURES 13 to 15 show a modification of the embodiment shown in FIGURES 10 to 12.

An end fitting 120 comprises two spigots 121 and 122 each of tubular form with a square cross-section. The two spigots are welded together and are covered at their adjoining ends with a cube 119 of plastics material moulded around the ends.

A sleeve 123 has the cross-section of a smaller square inside a larger square with the smaller square rotated by 45° with respect to the larger square. The spigot 121 is a sliding fit within the smaller square when the spigot and the sleeve are in the relative position shown in FIGURE 14.

The sleeve 123 is a silding fit within a tube 124 of square cross-section.

FIGURE 14 shows the tube 124, the sleeve 123 and the spigot 121 in the relative positions in which they are slid one within the other and the spigot is then rotated by 45° with regard to the sleeve and the tube, whereby to expand the sleeve into engagement with the tube. There are four axial grooves 125 in the centres of the faces of the inner square of the sleeve and the four corners of the spigot 121 engage with the grooves 125 in the locked position shown in FIGURE 15.

The end of the sleeve 123 nearer the cube 119 is provided with a flange 126 which spaces the end of the tube 124 from the cube. It will be appreciated that the sides of the cube 119 have the same lengths as the sides of the tube 124.

I claim:
1. A framework comprising a hollow tube having a non-circular internal cross-section of substantially regular polygonal shape, an end fitting having a body, a spigot extending from said body, an expandable sleeve of resiliently deformable material within the end portion of said tube and surrounding the spigot, said sleeve having an external cross-section substantially complementary to the internal cross-section of the tube and having a sliding fit within said tube, said sleeve having a bore of generally oval cross-section with the largest transverse dimension of the bore being contained in the same plane as that defined by the opposed corners of the sleeve, the spigot having a substantially oval cross-section of which the greatest dimension extends in the same plane as the largest transverse dimension of the bore of the sleeve and which dimension is greater than the smallest dimension of the bore of the sleeve, the spigot, tube and sleeve being so constructed and arranged that when the spigot is rotated to a position where its greatest dimension is aligned with the smallest dimension of the bore, the spigot, tube and sleeve will all be in locked frictional engagement.

2. A framework as claimed in claim 1 in which the spigot and the tube are aligned.

3. A framework as claimed in claim 1 in which another spigot extends from the body at an angle to the first-mentioned spigot, another expansive sleeve and another tube, the second-mentioned spigot, sleeve and tube being constructed and arranged like the first-mentioned spigot, tube and sleeve.

4. A framework as claimed in claim 3 in which each tube has a square cross-section, the body is a cube having the same cross-section as the external cross-section of the tubes, the spigots extend from different faces of the cube and the spigots and the sleeves are constructed and arranged so that the said sides of the cube are co-planar with sides of the tubes.

5. A framework as claimed in claim 1 having stop means to retain the sleeve on the spigot for axial movement therewith.

6. A framework comprising a hollow tube having a non-circular internal cross-section of substantially regular polygonal shape, an end fitting having a body, a spigot extending from said body, an expandable sleeve of resiliently deformable material within the end portion of said tube and surrounding the spigot, said sleeve having an external cross-section substantially complementary to the internal cross-section of the tube and having a sliding fit within said tube, said sleeve having a bore having a cross-section with a larger dimension in one transverse direction and a smaller dimension in another transverse direction with the smallest transverse dimension of the bore being contained in the same plane as that defined by opposed corners of the sleeve, the spigot having a cross-section which fits within the bore and of which the greatest dimension is greater than the smaller dimension of the bore whereby when the spigot is rotated so that its greatest dimension is in line with the smaller dimension of the bore, the spigot, tube and sleeve will be in locked frictional engagement.

7. A framework as claimed in claim 6 in which the bore has a square cross-section.

8. A framework as claimed in claim 7 in which the spigot has an external cross-section with four projections spaced at right angles to one another at the corners of a square, which projections fit inside the bore with the projections at the corners of the square and when the spigot is rotated the projections engage the sides of the square.

9. A framework as claimed in claim 8 in which the spigot is of square external cross-section and the projections are formed by the four corners of the square.

10. A framework comprising a hollow tube having a non-circular internal cross-section of substantially regular polygonal shape, an end fitting having a body, a spigot extending from said body, an expandable sleeve of resiliently deformable material within the end portion of said tube and surrounding the spigot, said sleeve having an external cross-section substantially complementary to the internal cross-section of the tube and having a sliding fit within the tube, said sleeve having a bore with a dimension extending diagonally in a plane from a corner of the polygon, the spigot having a cross-section of a shape enabling it to freely slide in said bore and through relative rotation of the tube and sleeve expand the sleeve friction tight against the interior of said tube; the spigot, tube and sleeve thus being so constructed and arranged that when the spigot is positioned at an angle to the said plane, the spigot, tube and sleeve will all be in locked frictional engagement.

11. A framework according to claim 10 wherein said sleeve also has a dimension in a plane crossing the first-mentioned plane and which is less than the first-mentioned dimension.

12. A framework comprising a hollow tube having a non-circular internal cross-section of substantially regular polygonal shape, an end fitting having a body, a spigot extending from said body, an expandable sleeve of resiliently deformable material within the end portion of said tube and surrounding the spigot, such a sleeve having an external cross-section substantially complementary to the internal cross-section of the tube and having a sliding fit within said tube, said sleeve being provided with a bore, the cross-section of which has at least one major axis and at least one minor axis, the spigot having at least one major axis and at least one minor axis in cross-section, the major axis of the spigot being of greater dimension than the dimension of the minor axis of the bore of the sleeve, the spigot, tube and sleeve being so constructed and arranged that when the spigot is positioned with its major axis in alignment with the minor axis of the sleeve the spigot, tube and sleeve will all be in locked frictional engagement.

References Cited

UNITED STATES PATENTS

| | | | |
|---|---|---|---|
| 3,000,656 | 9/1961 | Hollaender | 287—54 |
| 3,088,178 | 5/1963 | Propst | 52—585 XR |
| 3,155,405 | 11/1964 | Cadovius | 287—54 |
| 3,284,113 | 11/1966 | Howell | 52—656 XR |

BOBBY R. GAY, *Primary Examiner.*

R. D. KRAUS, *Assistant Examiner.*